Patented Feb. 9, 1932

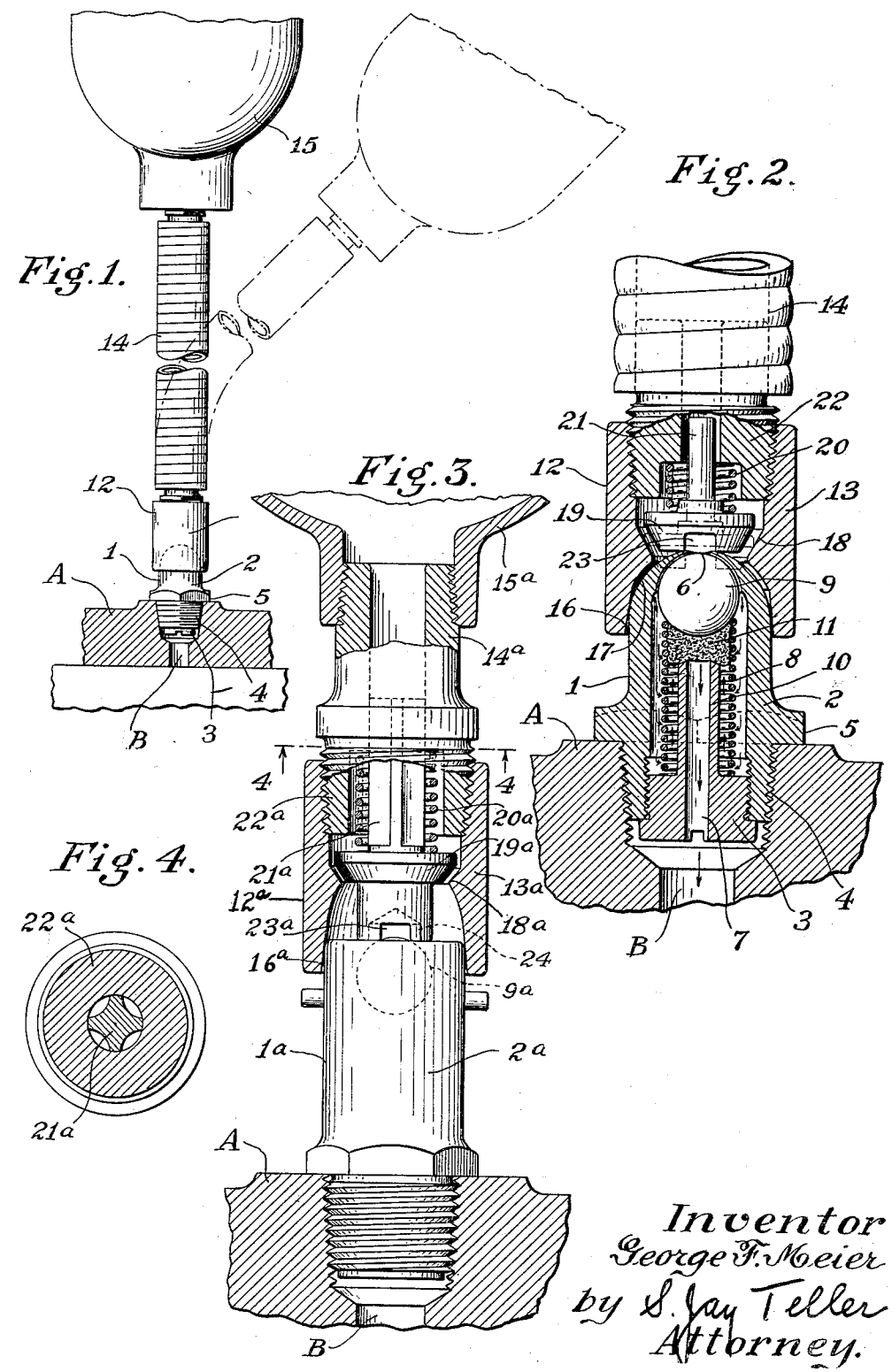

1,844,099

UNITED STATES PATENT OFFICE

GEORGE F. MEIER, OF WETHERSFIELD, CONNECTICUT

LUBRICATOR CONNECTING MEANS

Application filed March 12, 1929. Serial No. 346,381.

The present invention relates particularly to a portable connector or nozzle adapted to be connected with grease gun or other means for supplying lubricant under pressure and serving to provide a releasable joint or connection between the gun and a lubricating device or oiler carried by the mechanism to be lubricated.

The principal object of the invention is to provide a connector or nozzle of the character described which is adapted to be applied to and removed from the lubricating device or oiler with a minimum of effort on the part of the user and which nevertheless provides a reliable and substantially tight joint, notwithstanding differing angular relationships. A device embodying the invention not only has the advantages set forth but in addition it is simple and can be inexpensively manufactured.

Other objects of the invention will be apparent from the following specification and claims.

In the accompanying drawings I have shown certain embodiments of the invention, but it will be understood that the drawing is for illustrative purposes only and is not to be construed as defining or limiting the scope of the invention, the claims forming a part of this specification being relied upon for that purpose.

Of the drawings:

Fig. 1 is a fragmentary elevational view of the connector combined with a grease gun and lubricating device.

Fig. 2 is an enlarged fragmentary longitudinal sectional view.

Fig. 3 is a view similar to Fig. 2 but showing an alternative construction.

Fig. 4 is a transverse sectional view taken along the line 44 of Fig. 3.

In Figs. 1 and 2 I have shown a lubricator or oiler of the type shown and described in detail in my copending application for Lubricators, Serial No. 268,715, filed April 9th, 1928, of which application this present application is a continuation in part. As concerns the present invention I do not limit myself to a lubricator of the construction referred to, but such a lubricator is shown and will now be described.

The lubricator 1 is shown as threaded into a casting A having an oil hole B therein. The main body of the lubricator comprises a hollow shell 2 and a plug 3 is provided which closes the inner end of the shell. The plug is preferably threaded into the shell and is provided with a screw driver slot to facilitate assembly and disassembly. As shown the shell 2 is externally threaded at 4 in order that it may be conveniently held in place, as for instance on the casting A, but if desired other means of mounting and connection may be provided. When the shell 2 is threaded as shown it is preferably provided with a square or hex at 5 in order that it may be conveniently turned. The body of the lubricator is provided with separate lubricant inlet and outlet openings, and as shown there is provided an inlet opening 6 in the top of the shell 2 and an outlet opening 7 in the plug 3 at a position opposite that of the inlet opening.

Positioned within the hollow body of the lubricator is a helical coil of wire 8, which is so disposed that lubricant in passing from the inlet opening 6 to the outlet opening 7 must flow between the convolutions of the coil, for instance, as indicated by the arrows in Fig. 2. The convolutions of the coil 12 are very closely spaced so as to enable the coil to serve as a strainer for the lubricant.

Preferably a closure element is provided for the inlet opening 6, this ordinarily being in the form of a ball 9. The aforesaid coil 8 acts as a spring to yieldingly hold the said ball 9 in inlet closing position. The upper end of the spring abuts against the ball and the lower end abuts against the plug 3. By reference to Fig. 2 it will be observed that the ball 9 can be pressed downward or inward to permit the lubricant to flow inward through the opening 6 and around the ball as indicated by the arrow.

There is provided a tube or riser 10 within the body of the lubricator which communicates at one end with the outlet opening 7 and which is at least partly open at the other end. The coil or spring 8 is positioned to surround the tube 10, which is considerably smaller than the coil. Obviously the lubricant must pass through the tube 10 to reach the outlet opening 7. If desired a body of felt 11 may be provided at the top of the tube 10 to further strain the lubricant.

I provide a connection device or nozzle 12 having a main body 13. The connection device 12 is suitably connected, as by means of a flexible pipe 14, with an oil or grease gun 15 or other means for supplying lubricant under pressure. In accordance with the present invention the main bodies 3 and 13 of the lubricating and connecting devices have male and female interengaging portions with exterior and interior contact surfaces. The contact surface of one of them is tapered to form a tight but easily separable joint between the two devices; and the contact surface of the other body is a surface of revolution generated by a convex curve, so as to permit engagement between the two bodies only at a circular line of contact. As shown and as preferred the body 2 of the lubricating device is provided with a convex surface 17, which is a surface of revolution as already stated, and the body 13 of the connection device is formed with an interior conical surface 16 adapted to engage the exterior surface 17 of the body 2. The slight taper above referred to, whether provided by the surface 16 or otherwise, is commonly known as a "sticking taper", having an included angle of not over 12° and ordinarily considerably less than 12°, as for instance 4°. As the result of this small included angle, the circular line of contact is located near the crest of the convex curve of generation already referred to. When the convex surface is an exterior surface, as shown at 17 in the drawings, the circular line of contact is located near the maximum diameter of the body having the said surface. The connector 12 may be engaged with the lubricator 9, by endwise movement coupled if desired with a slight rotative movement. The rotative movement serves to lock the parts together and also serves to wipe off any accumulated dirt on the engaging surfaces. The small included angle enables the tapered or conical surface, upon engagement, to resist separation of the bodies and thus form a tight but easily releasable joint.

The effecting of engagement only along a circular line as stated, makes it possible for sufficient pressure to be applied manually when the devices are first connected to squeeze out any oil film which may be present. This results in metal-to-metal contact which is essential in order to obtain the sticking action which has been described. If the engagement were not restricted to line contact, the presence of an oil film distributed over a wide surface would prevent the required metal-to-metal contact and there would be no sticking action; and as a result the parts would be forced apart as soon as the interior lubricant reached a sufficient pressure.

The provision of a convex contact surface on one of the bodies not only has the advantage of providing the required circular line of engagement with the resultant metal-to-metal contact, but it also has the further advantage that it makes it possible for the bodies to be connected when they are at any one of a plurality of different angular positions. With the construction disclosed it is unnecessary for the parts to be accurately aligned at the time of engagement.

Preferably the connector 12 is provided with a valve which prevents the escape of lubricant when the connector is disengaged from the oiler. I have shown the body 13 of the connector as formed with a conical valve seat 18. A valve closure 19 is provided which is normally held against the seat 18 by means of a spring 20 surrounding a stem 21 and abutting at its upper end against an apertured plug 22. The valve closure is so related to the other parts that it is engaged by the end of the lubricating device or oiler and forced to open position as shown in Fig. 2. In order that the oil or other lubricant may more easily reach the inlet opening 6 the valve closure 19 is provided with a transverse slot 23.

With the connector 12 in place as shown oil or other lubricant can be forced by the gun or pump 15 into the oiler, the ball 9 being pushed inward and the lubricant flowing to the outlet opening 7 all as already described. Upon disengagement of the connector the valve 19 immediately closes and prevents the escape of lubricant.

In Figs. 3 and 4 I have shown an alternate embodiment of the invention, there being provided a connection device or nozzle 12$^a$ particularly adapted for use with a lubricator or oiler 1$^a$ having a body 2$^a$ of cylindrical form with a substantially flat end. The upper edge of the body 2$^a$ is rounded, and this rounded edge constitutes a surface of revolution, corresponding in function to the surface 17 shown in Fig. 2. This oiler 1$^a$ may be of standard commercial form or it may have the interior parts like those shown in Fig. 2. As shown the oiler is of a standard commercial form having projecting pins for the attachment of a nozzle.

The body 13$^a$ of the connection device 12$^a$ is formed with a conical interior surface 16$^a$ adapted to engage the circular end portion of the body 2$^a$ of the oiler, the said surface having a "sticking taper" and functioning as already described.

The connection device 13$^a$ has a valve closure 19$^a$ normally held in engagement with a seat 18$^a$ by means of a coil spring 20$^a$ surrounding a stem 21$^a$. The said stem 21$^a$ is provided with longitudinal grooves as shown to permit the lubricant to flow through the aperature in the plug 22ª.

The valve closure 19ª has an extension at its lower end adapted to engage the oiler for the purpose of opening the valve. This extension has a transverse slot 23ª therein to permit the lubricant to reach the inlet opening of the oiler. Preferably a recess such as 24 is formed in the end of the lower extension on the valve closure to prevent the said extension from engaging the ball 9ª of the oiler. Thus the said ball is moved only by the pressure of the oil and moves only enough to permit the oil to pass. I thus minimize the possibility of dirt being carried into the oiler by the oil. Furthermore, when the interior construction is as shown in Fig. 2, I avoid the possibility of moving the ball so far as to entirely close the spring and thus prevent the passage of oil to the outlet opening.

In lieu of the flexible pipe 14 shown in Figs. 1 and 2, I have shown in Fig. 3 a rigid connection between the nozzle 12ª and the grease gun 15ª. The details of this rigid connection may be varied, but I have shown an integral extension 14ª on the plug 22ª, which integral extension is threaded directly into the body of the gun. The rigid connection between the gun and the nozzle has the advantage that the nozzle may be engaged with or removed from the oiler without the necessity for directly touching the nozzle. The user by properly holding and manipulating the gun can easily effect the entire lubricating operation.

What I claim is:

1. A lubricating device comprising in combination, a relatively fixed body having a central opening for the passage of lubricant to a mechanism to be lubricated, and a portable body having a central lubricant opening adapted to communicate with a means for supplying lubricant under pressure, one of the said bodies having an exterior contact surface and the other of the said bodies having an interior contact surface providing a recess in communication with the corresponding lubricant opening and adapted to engage the exterior contact surface of the other body, and one of the said contact surfaces being a surface of revolution generated by a convex curve so as to permit engagement between the two surfaces at a circular line of contact and the other of the said surfaces being substantially conical with an included angle between its opposite sides sufficiently small to locate the said circular line of contact near the crest of said convex curve of generation and to thus enable the said two surfaces upon engagement to resist longitudinal separation of the said bodies.

2. A lubricating device comprising in combination, a relatively fixed body having a central opening for the passage of lubricant to a mechanism to be lubricated, and a portable body having a central lubricant opening adapted to communicate with a means for supplying lubricant under pressure, one of the said bodies having an exterior contact surface which is a surface of revolution generated by a convex curve and the other of the said bodies having an interior substantially conical contact surface providing a recess in communication with the corresponding lubricant opening and adapted to engage the exterior contact surface of the other body at a circular line of contact, the included angle between the opposite sides of the said conical surface being sufficiently small to locate the said circular line of contact near the maximum diameter of the body having the exterior contact surface and to thus enable the said two surfaces upon engagement to resist longitudinal separation of the said bodies.

3. A lubricating device comprising in combination, a relatively fixed body having a central opening for the passage of lubricant to a mechanism to be lubricated and having an exterior contact surface, and a portable body having a central lubricant opening adapted to communicate with a means for supplying lubricant under pressure and having an interior contact surface forming a recess in register with the last said lubricant opening and adapted to engage the exterior contact surface of the first body, one of the said surfaces being a surface of revolution generated by a convex curve so as to permit contact between the two surfaces at a circular line when the said bodies are at any one of a plurality of angularly different positions and the other of the said surfaces being substantially conical with an included angle between its opposite sides sufficiently small to locate the said circular line of contact near the crest of the said convex curve of generation and to thus enable the said two surfaces upon engagement to resist longitudinal separation of the said bodies.

In testimony whereof, I subscribe my name to this specification.

GEORGE F. MEIER.